United States Patent
Chien

(10) Patent No.: US 8,266,641 B2
(45) Date of Patent: Sep. 11, 2012

(54) DISC LOADING AND EJECTING STRUCTURE FOR SLOT-IN OPTICAL DISC DRIVES

(75) Inventor: Hung-Chang Chien, Hsinchu (TW)

(73) Assignee: Lite-On It Corporation, Taipei (TW)

(*) Notice: Subject to any disclaimer, the term of this patent is extended or adjusted under 35 U.S.C. 154(b) by 366 days.

(21) Appl. No.: 12/770,189

(22) Filed: Apr. 29, 2010

(65) Prior Publication Data

US 2011/0185374 A1    Jul. 28, 2011

(30) Foreign Application Priority Data

Jan. 25, 2010 (CN) .......................... 2010 1 0103668

(51) Int. Cl.
 *G11B 17/051* (2006.01)
 *G11B 17/04* (2006.01)
(52) U.S. Cl. ........................ 720/621; 720/625
(58) Field of Classification Search ........... 720/620–625
 See application file for complete search history.

(56) References Cited

U.S. PATENT DOCUMENTS

| | | | |
|---|---|---|---|
| 4,498,162 A * | 2/1985 | Schatteman | 720/620 |
| 4,682,320 A * | 7/1987 | d'Alayer de Costemore d'Arc | 720/621 |
| 6,628,590 B1 * | 9/2003 | Matsuo et al. | 369/53.2 |
| 2009/0150911 A1 | 6/2009 | Akama et al. | |
| 2010/0083292 A1 * | 4/2010 | Azai | 720/621 |

FOREIGN PATENT DOCUMENTS

| | | | |
|---|---|---|---|
| JP | 09055006 A | * | 2/1997 |
| JP | 2001101745 A | * | 4/2001 |
| JP | 2002269883 A | * | 9/2002 |
| JP | 2005085342 A | * | 3/2005 |
| JP | 2005116029 A | * | 4/2005 |

* cited by examiner

*Primary Examiner* — Will J Klimowicz
(74) *Attorney, Agent, or Firm* — Muncy, Geissler, Olds & Lowe, PLLC

(57) ABSTRACT

A disc loading and ejecting structure for a slot-in optical disc drive aims to drive a compact disc into and out of the slot-in optical disc drive to solve the problems of conventional techniques that they are bulky and occupy too much space. The structure includes a driving portion and a guiding portion that are located at two opposite sides of the slot-in optical disc drive. The driving portion includes a roller with the rotation axis parallel with a positioning surface of the compact disc. A first end edge of the compact disc is abutted on the guiding portion and a second end edge is leaned on the roller. The roller can rotate and move reciprocally in parallel with the direction of the rotation axis to drive the compact disc into and out of the slot-in optical disc drive.

15 Claims, 10 Drawing Sheets

DISC LOADING AND EJECTING STRUCTURE FOR SLOT-IN OPTICAL DISC DRIVES

FIELD OF THE INVENTION

The present invention relates to a disc loading and ejecting structure for slot-in optical disc drives and particularly to a disc loading and ejecting structure with a moving roller for a slot-in optical disc drive.

BACKGROUND OF THE INVENTION

Slot-in optical disc drives can load and eject discs easily, thus have increasingly replaced the tray-type optical disc drives in recent years and are widely adopted on notebook computers, all-in-one computers, vehicle players or game machines. Refer to FIG. 1 for a conventional slot-in optical disc drive 1 which has an opening 2 to receive and position a compact disc 3 at a selected location. The optical disc drive 1 contains an optical pickup head to access data stored in the compact disc 3. Compared with the tray-type optical disc drive, the slot-in optical disc drive has a smaller disc loading and ejecting apparatus to guide and position the compact disc in the optical disc drive, and requires less space without installing a tray mechanism, thus can shrink the volume of the optical disc drive. In addition, the disc loading and ejecting system is more appealing in use in terms of human/machine interaction.

Refer to FIG. 2 for the disc loading and ejecting apparatus of the conventional slot-in optical disc drive 1. It includes a base board 4 with a vertical wheel 5 and a guide portion 6 located thereon. The axis of the vertical wheel 5 is perpendicular to the base board 4 and the positioning surface of a compact disc 3. When the compact disc 3 is inserted into the slot-in optical disc drive 1, two end edges of the compact disc 3 respectively abuts the guide portion 6 and the vertical wheel 5. The guide portion 6 provides a friction force to the compact disc 3 and forms a contact point with the compact disc 3 to serve as a fulcrum. The vertical wheel 5 is rotated to drive and swivel the compact disc 3 into the slot-in optical disc drive 1.

A similar technique can be found in U.S. Publication No. 2009/0150911 entitled "Disk drive" which has a vertical wheel mounted onto a loading arm which can rotate about a fulcrum. By rotating the loading arm, the vertical wheel leans closely on the circumference of a compact disc for providing a driving force on the disc. The position of the vertical wheel can be changed in response to the entry of the compact disc.

However, the design of the slot-in optical disc drive gradually focuses on slim and light to conform to the prevailing trend. The swinging loading arm of the convention art occupies too much horizontal space, thus the transverse width of the optical disc drive is constrained. Moreover, the vertical wheel generally is formed at a small diameter and rotated at a high speed, thus results in an inadequate torsional force on the disc. This could make loading of the compact disc into the optical disc drive difficult or impossible. Moreover, the slot-in optical disc drive adopted such design also has a shorter life span and tends to generate noises.

SUMMARY OF THE INVENTION

In view of the aforesaid concerns, the primary object of the present invention is to provide a disc loading and ejecting structure for a slot-in optical disc drive that has simpler structure and smaller size and adoptable to a slim and light slot-in optical disc drive.

To achieve the foregoing object, the disc loading and ejecting structure according to the invention aims to drive a compact disc into and out of a slot-in optical disc drive. It includes a driving portion and a guiding portion that are located at two opposite sides of the slot-in optical disc drive. The driving portion includes a roller with a rotation axis in parallel with a positioning surface of the compact disc. The compact disc has a first end edge abutted on the guiding portion and a second end edge leaned on the roller while the disc is inserted into and ejected from the slot-in optical disc drive. The roller is movable reciprocally in parallel with the direction of the rotation axis thereof.

By means of the structure set forth above, the disc loading and ejecting structure occupies less space of the optical disc drive, thus the optical disc drive can be made thinner and lighter.

The foregoing, as well as additional objects, features and advantages of the invention will be more readily apparent from the following detailed description, which proceeds with reference to the accompanying drawings.

DETAILED DESCRIPTION OF THE PREFERRED

Embodiments

Figure 1:
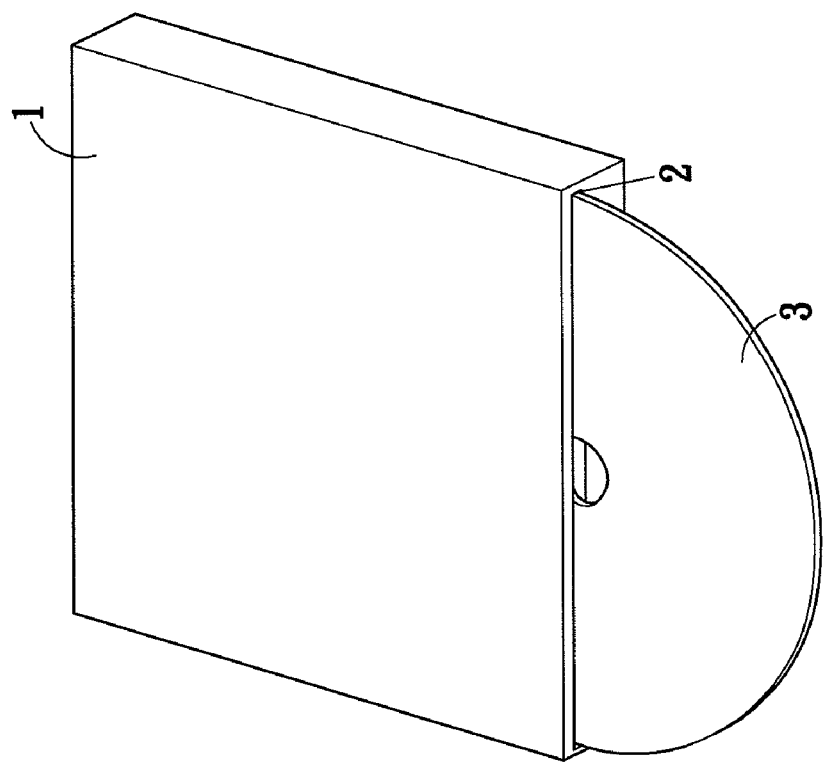
FIG. 1 is a perspective view of a conventional slot-in optical disc drive.
Figure 2:
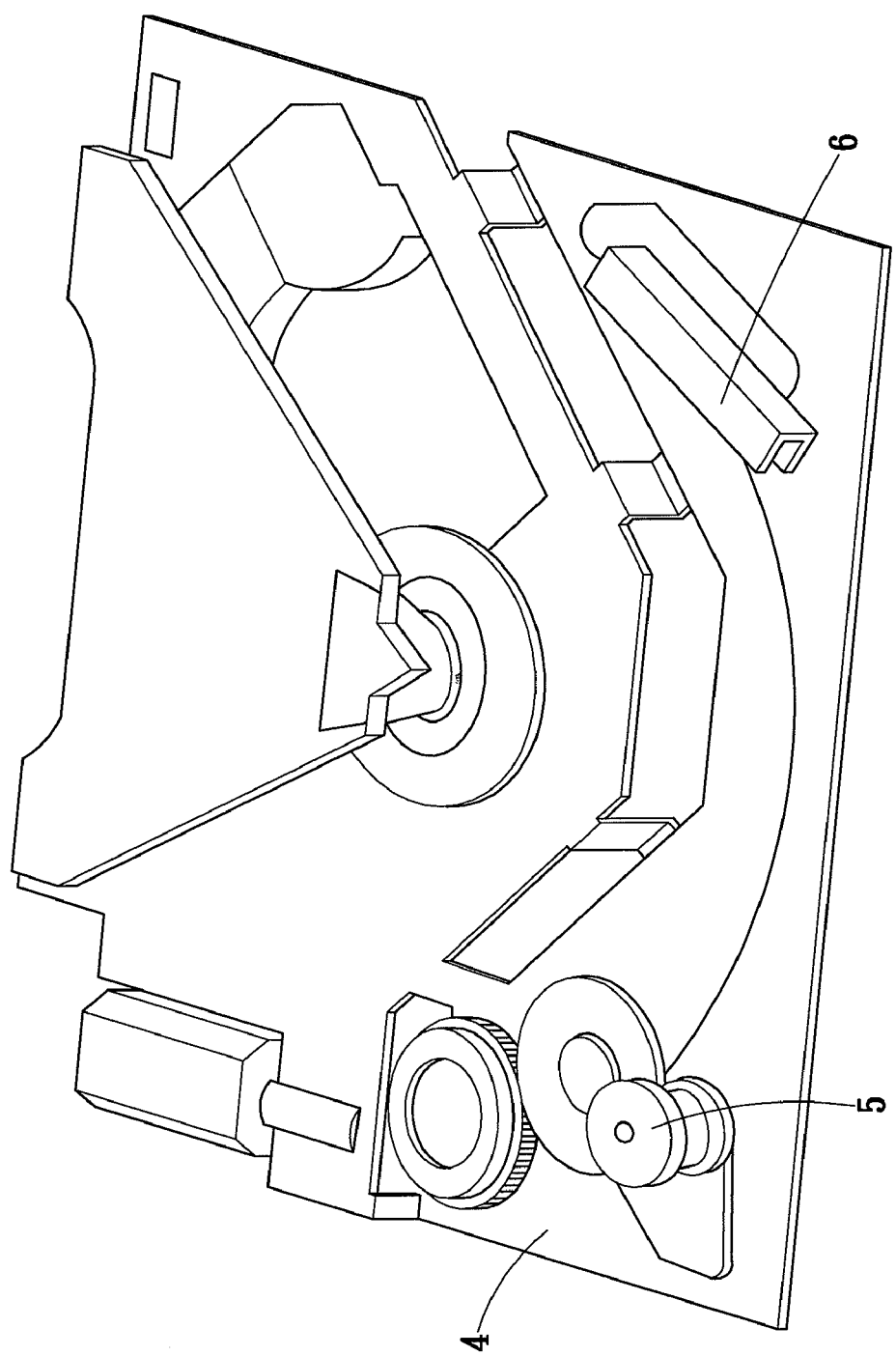
FIG. 2 is a schematic view of a disc loading and ejecting structure of the conventional slot-in optical disc drive.
Figure 3:
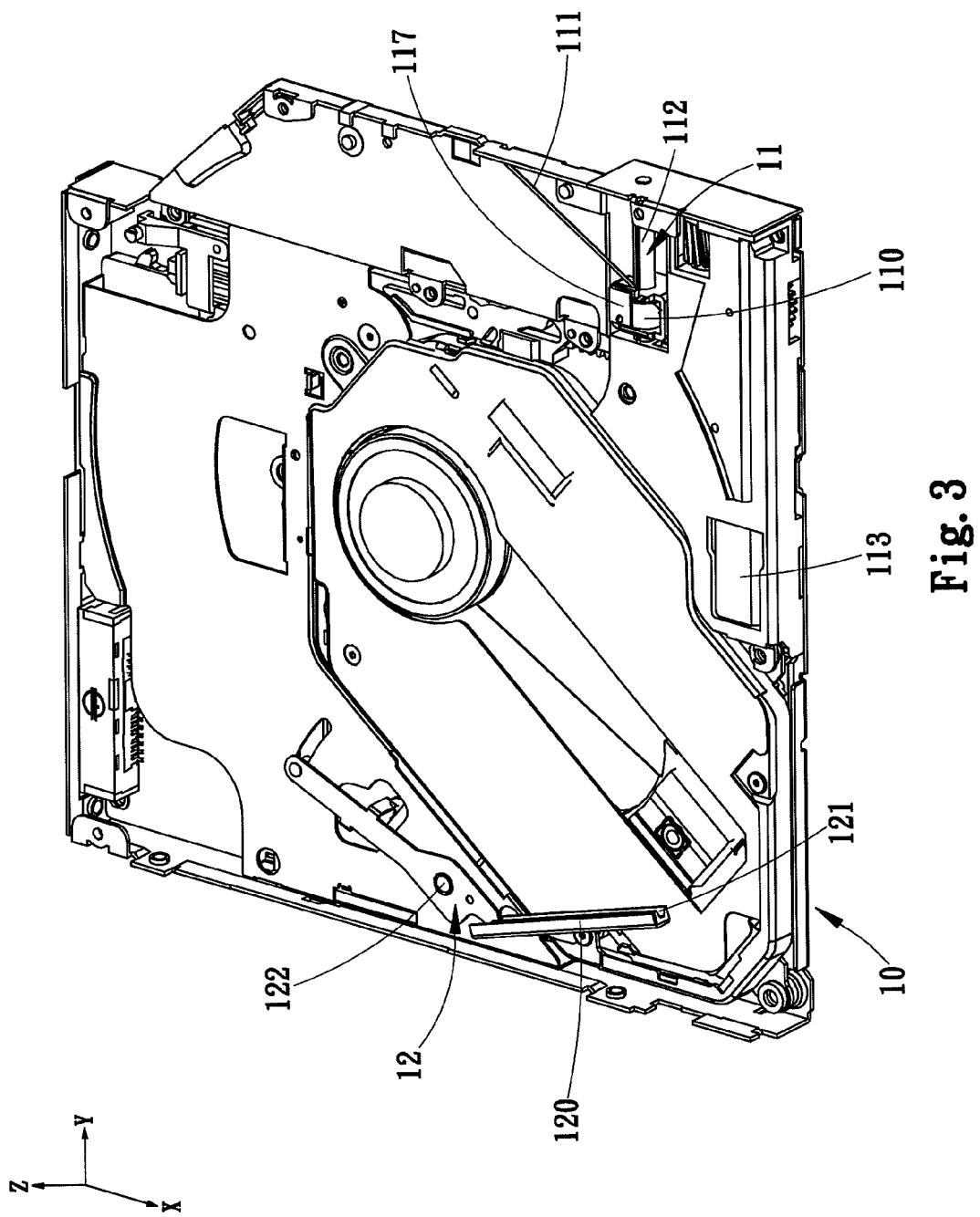
FIG. 3 is a perspective view of the disc loading and ejecting structure for slot-in optical disc drives of the invention.

Please refer to FIG. 3 for an embodiment of the disc loading and ejecting structure for slot-in optical disc drives of the invention. The structure aims to drive a compact disc 3 into or out of a slot-in optical disc drive 10. The disc loading and ejecting structure comprises a driving portion 11 and a guiding portion 12 that are located at two opposite sides of the slot-in optical disc drive 10 as shown in FIG. 3. The driving portion 11 includes a roller 110 whose rotation axis is substantially in parallel with a positioning surface of the compact disc 3. It is to be noted that the "positioning surface" mentioned above means a rotating plane after the compact disc 3 has been loaded and held in the slot-in optical disc drive 10, namely same as the XY plane shown in FIG. 3.

The compact disc 3 has a first end edge and a second end edge in contact with the guiding portion 12 and the driving portion 11, respectively. When the compact disc 3 is inserted into the slot-in optical disc drive 10 through an opening thereof, the first end edge of the compact disc 3 is abutted and held by the guiding portion 12 which provides friction resistance to form a relative static end. The second end edge of the compact disc 3 is leaned on the roller 110 which provides an action force by rotation of the roller 110. The compact disc 3 is swung into the slot-in optical disc drive 10 around the first end edge which serves as the fulcrum.

Figure 4A:
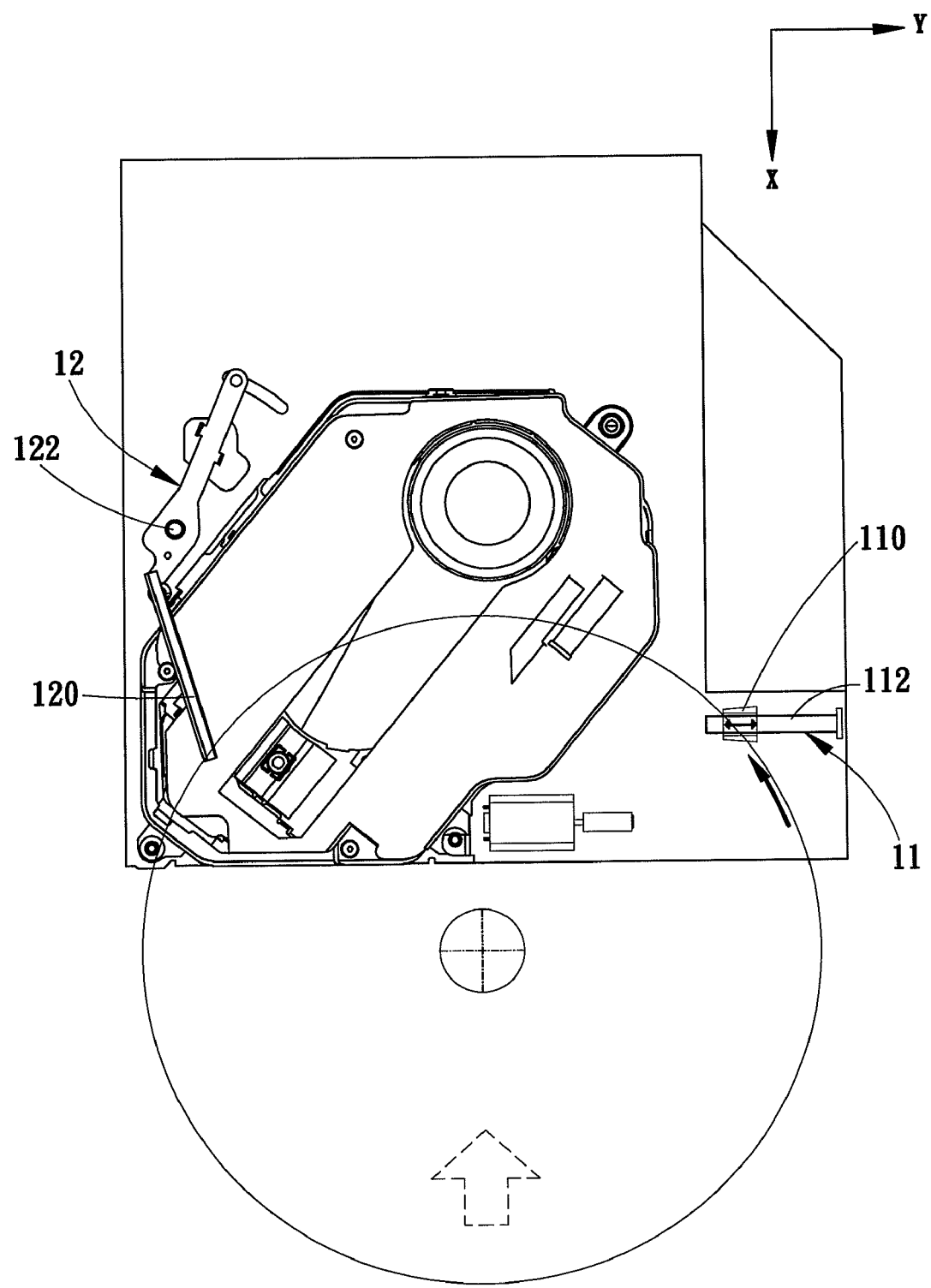
FIGS. 4A and 4B are schematic views of loading a compact disc by the disc loading and ejecting structure into the optical disc drive in a first embodiment.
Figure 4B:
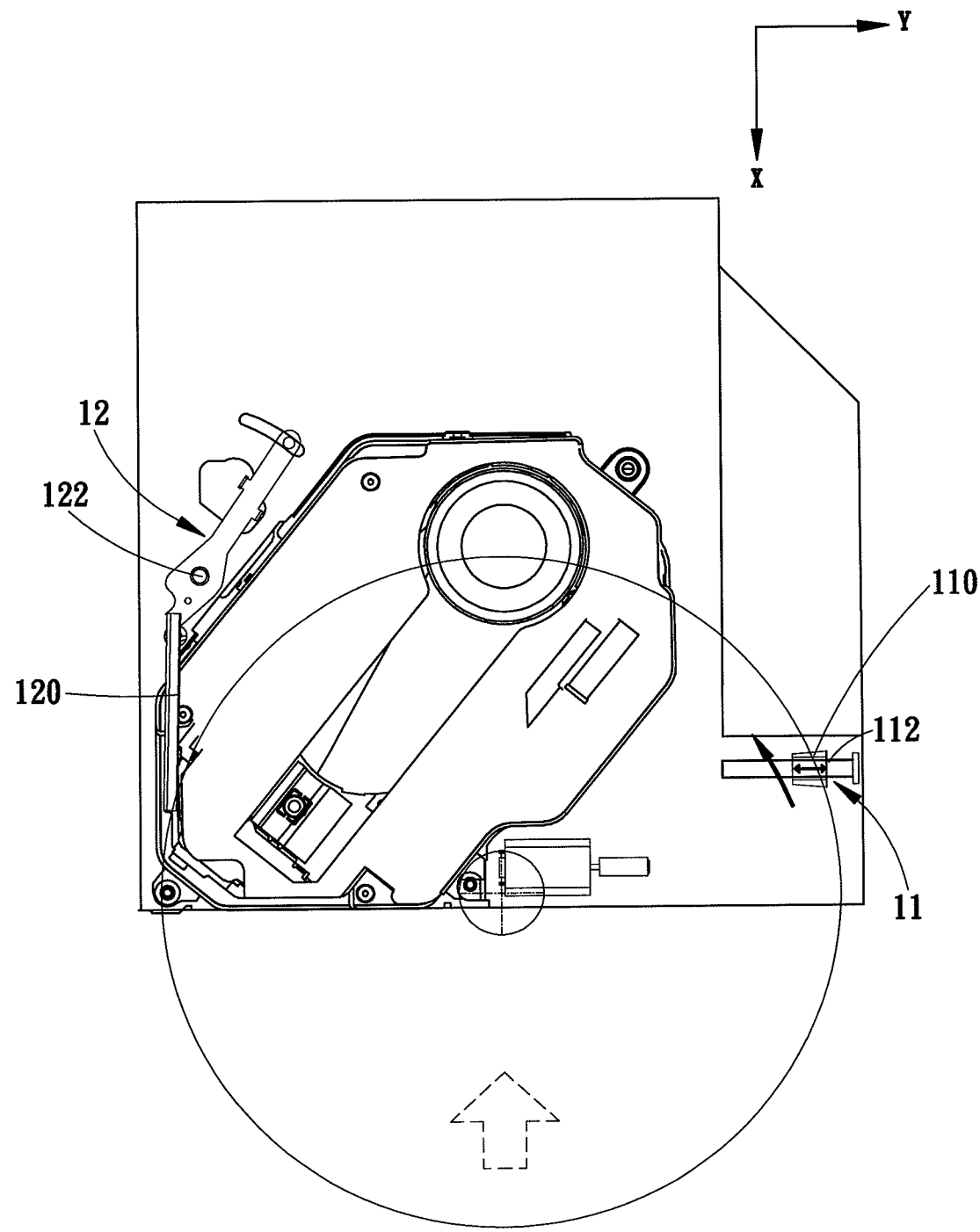

When loading the compact disc 3 into the slot-in optical disc drive 10, the roller 110 is movable reciprocally in parallel with the direction of the rotation axis thereof (i.e. Y axis shown in the drawings). Hence the distance between two end edges of the compact disc 3 is changeable with the movement thereof so that the compact disc 3 is smoothly loaded into the optical disc drive 10 as shown in FIGS. 4A and 4B. In FIGS. 4A and 4B, the roller 110 is moved rightwards to load the disc 3. On the other hand, the roller 110 moves leftwards and rotates reversely to eject the disc 3.

In the embodiment previously discussed, the guiding portion 12 includes a guiding member 120 formed in an elongate groove with a retaining space 121. The retaining space 121 mates the thickness of the compact disc 3 so that the first end edge of the compact disc 3 can be abutted and held by the guiding member 120 and retained in the retaining space 121. No offset along the Z axis is occurred and the loading and ejection of the compact disc 3 is smooth.

Figure 5A:
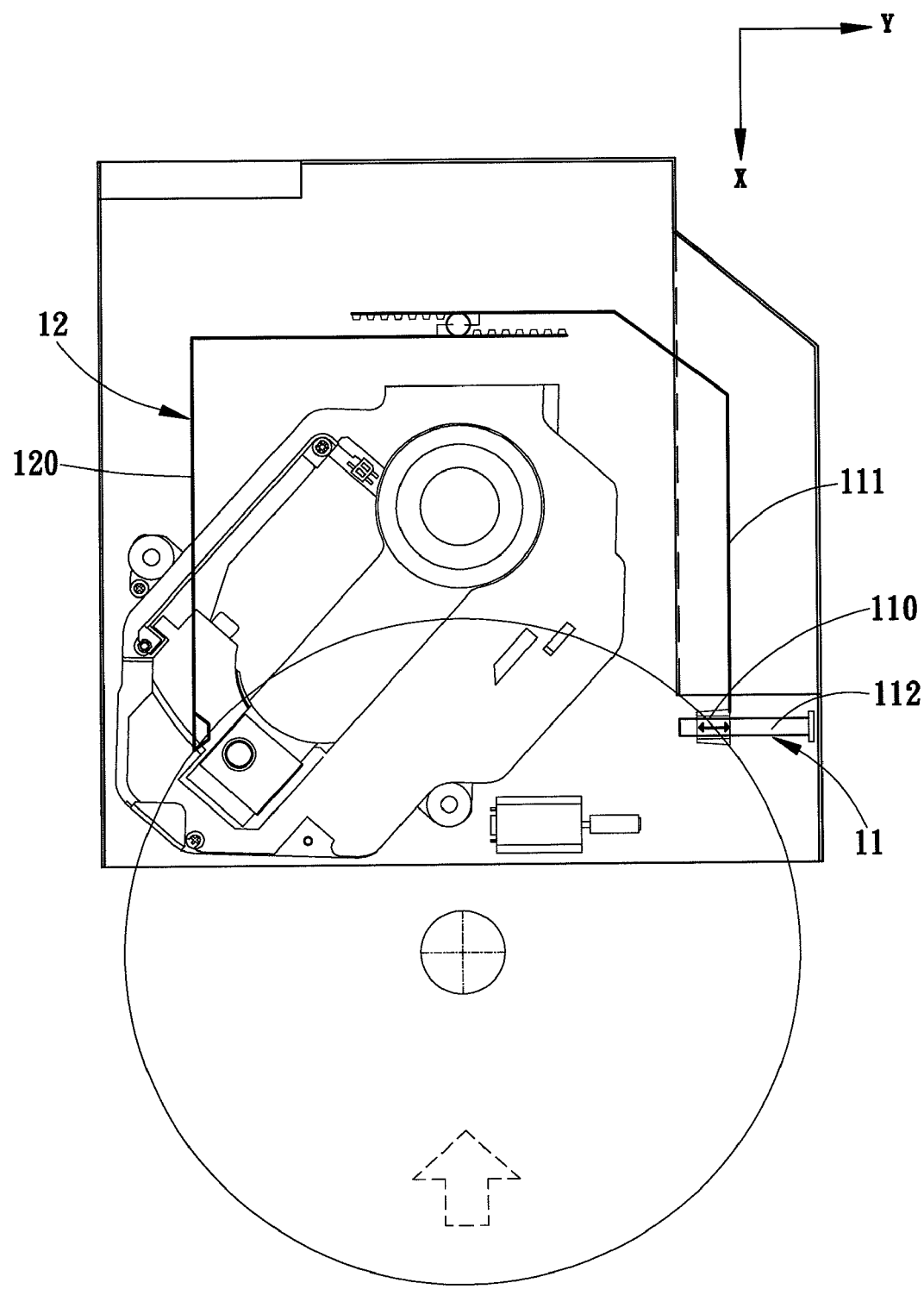
FIGS. 5A and 5B are schematic views of loading a compact disc by the disc loading and ejecting structure into the optical disc drive in a second embodiment.
Figure 5B:
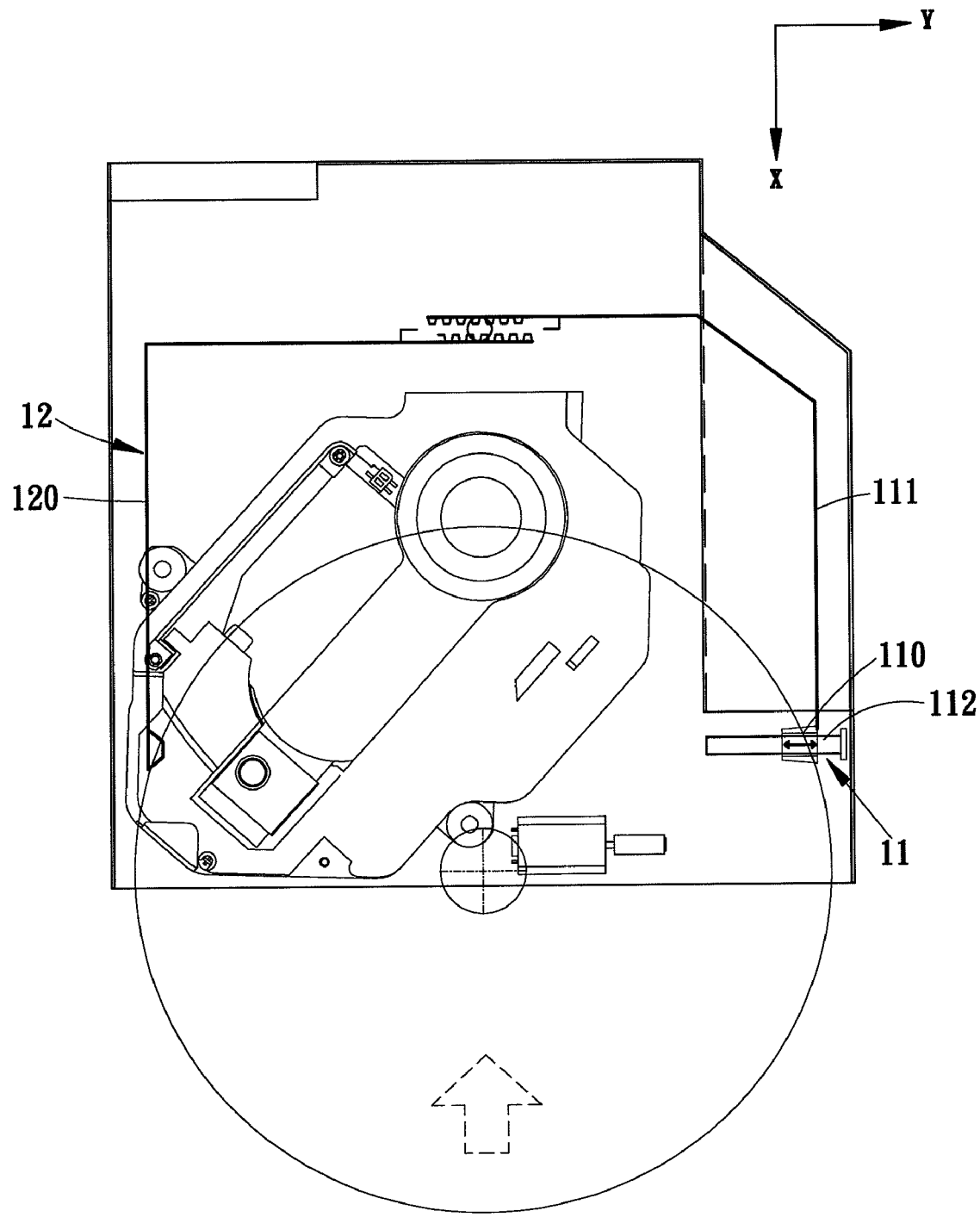

The guiding portion 12 also can be moved according to the position of the compact disc 3 so that the distance between two end edges of the compact disc 3 is changeable with the movement thereof. Refer to FIGS. 4A and 4B for an embodiment of the movement of the guiding portion 12. The guiding portion 12 is turnable about a fulcrum 122 to change the angle and position thereof in response to the position of the compact disc 3. FIGS. 5A and 5B illustrate another embodiment of the guiding portion 12 and movement thereof. The guiding portion 12 moves transversely in the Y axis direction opposite to the roller 110. In FIGS. 5A and 5B, the guiding member 120 moves leftwards according to the loading position of the compact disc 3. On the other hand, the guiding member 120 moves rightwards together with the reverse rotation of the roller 110 to eject the disc 3.

The driving portion 11 may include a limiting member 111 for providing an action force on the roller 110 so that the second end edge of the compact disc 3 is continuously leaned on the roller 110 while the roller 110 is moved reciprocally. In FIG. 3, the limiting member 111 is an elastic element for providing a returning force on the roller 110. In FIGS. 5A and 5B, the limiting member 111 is movable horizontally in Y axis direction with the roller 110 so that the second end edge of the compact disc 3 is leaned on the roller 110 continuously.

Figure 6:
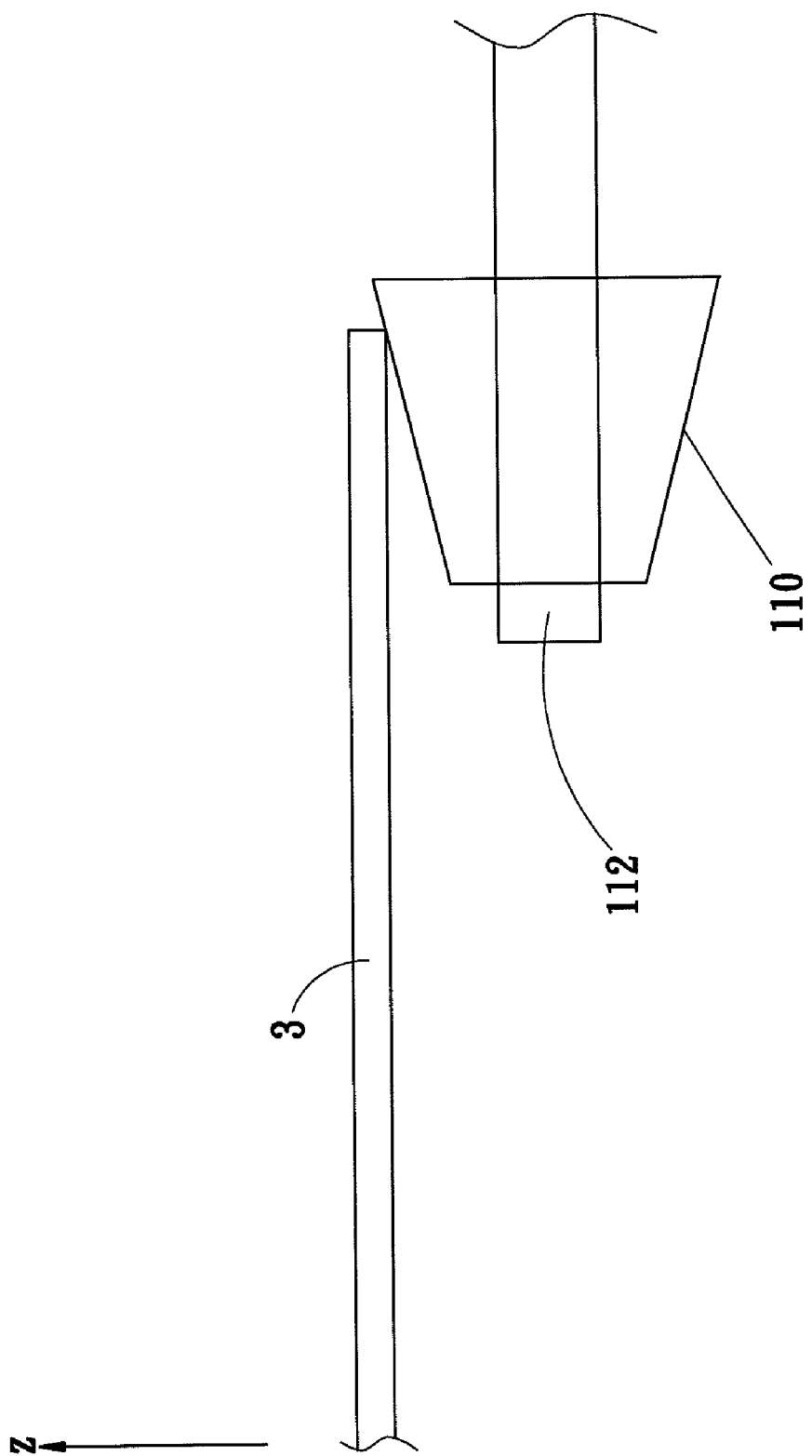
FIG. 6 is a schematic view of a bevel roller.

Referring to FIG. 6, the roller 110 may also be a bevel roller to minimize the second end edge of the compact disc 3 leaned on the roller 110 and to avoid damaging the surface of the compact disc 3 during the rolling of the roller 110. The roller 110 is formed at a suitable size to facilitate loading and ejecting the compact disc 3 with varying sizes into or out of the optical disc drive 10.

Figure 7:
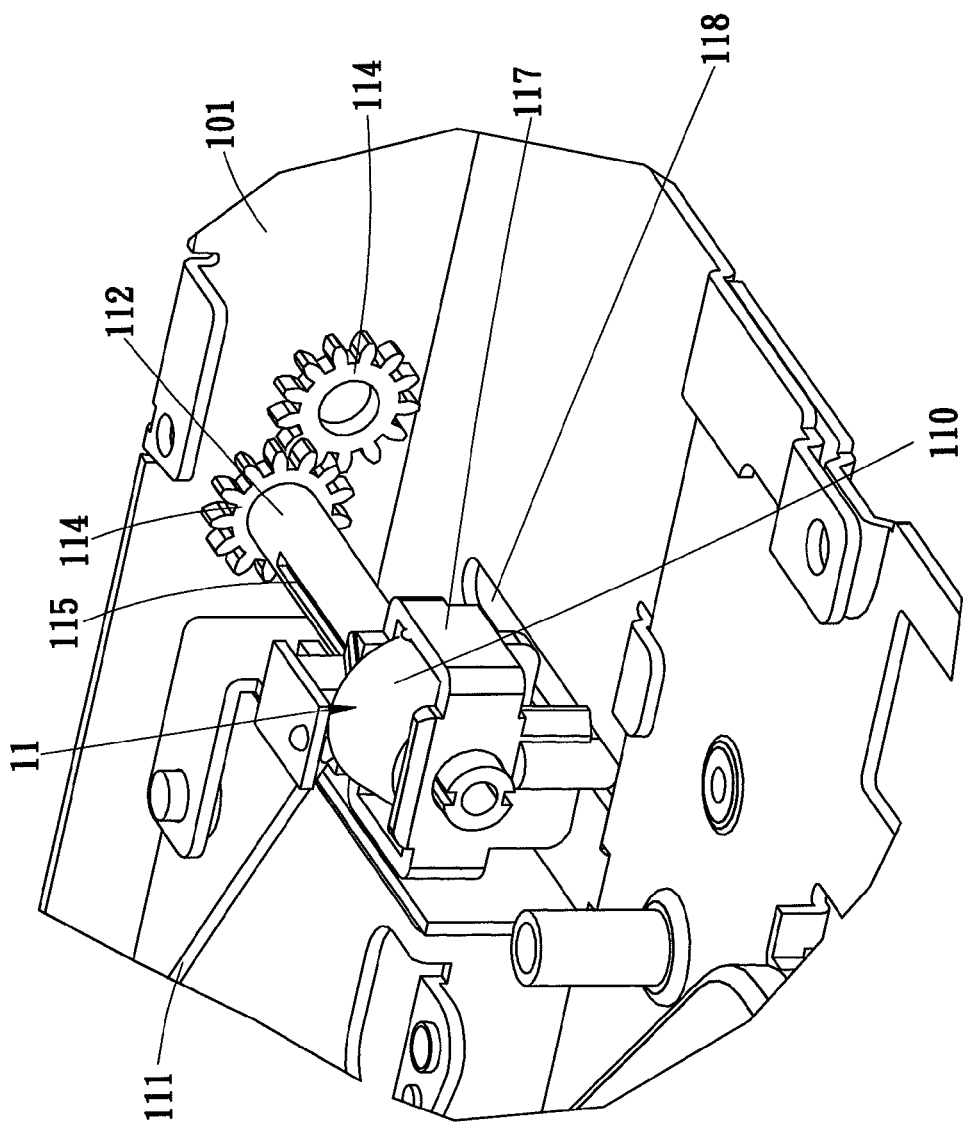
FIG. 7 is a perspective view of the driving portion of the invention.
Figure 8:
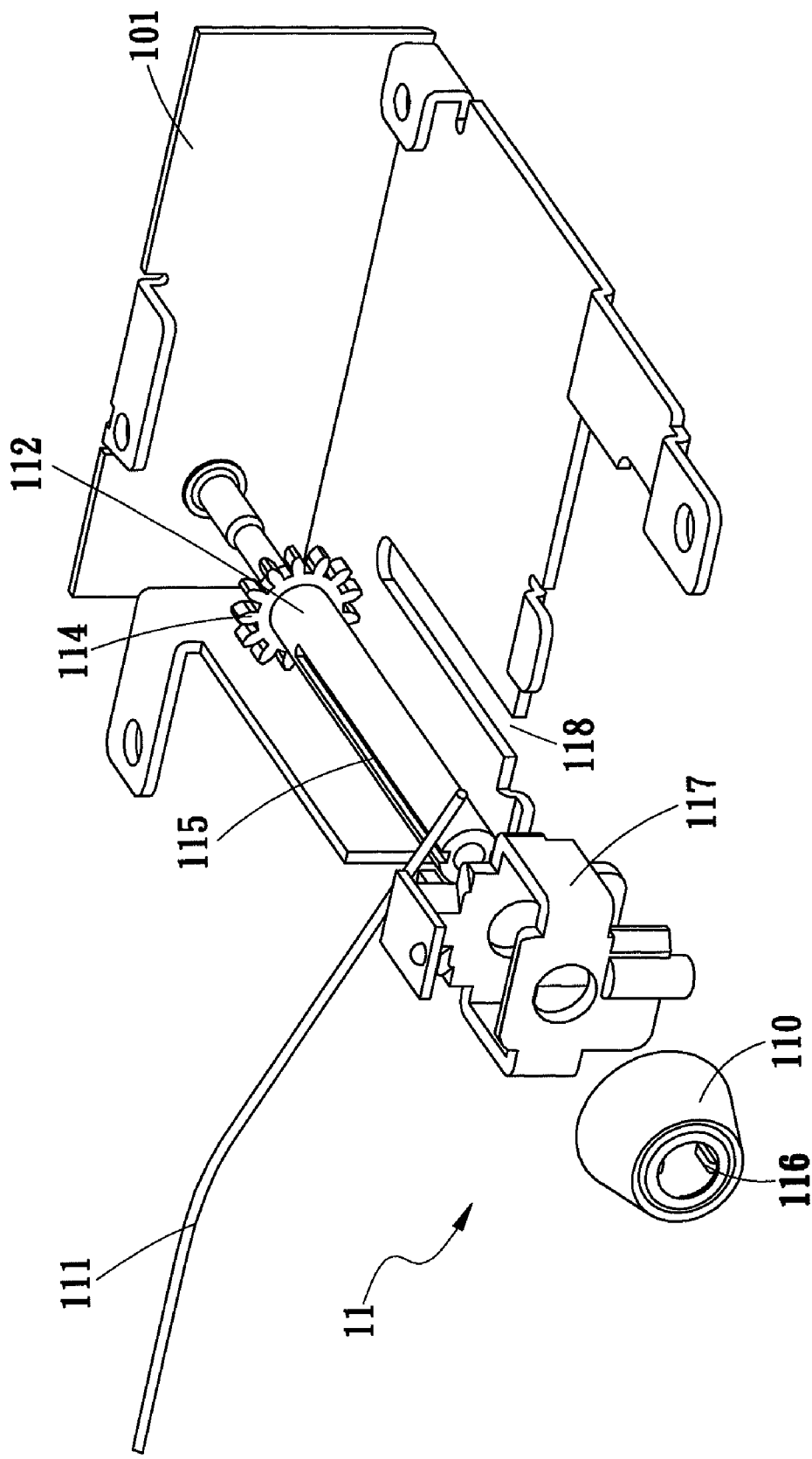
FIG. 8 is an exploded view of the driving portion of the invention.

Please refer to FIGS. 3, 7 and 8 for an embodiment of the driving portion 11 which includes a roller 110, an axle 112 and a power source 113. The axle 112 is parallel with the positioning surface of the compact disc 3, and coupled with an upright wall 101 in the slot-in optical disc drive 10. The power source 113 can be a motor to rotate the axle 112 through a plurality of engaging gears 114. The roller 110 is coupled on the axle 112 which has a plurality of guiding tracks 115 in parallel with the axis thereof (two guiding tracks 115 are shown in the drawings in an up and down manner). The roller 110 includes a plurality of latch members 116 mating the size of the guiding tracks 115 so that the roller 110 is held and slid on the guiding tracks 115. When the axle 112 rotates, the guiding tracks 115 drive the latch members 116 to rotate the roller 110.

In the embodiment set forth above, the roller 110 is held on a holding member 117 which is coupled on the axle 112 and can slide on the axle 112 and a track 118 with the roller 110. The holding member 117 balances and supports the roller 110. In this embodiment, the limiting member 111 leans on the holding member 117 to provide a returning force for the roller 110 after the holding member 117 slides towards the upright wall 101 so that the roller 110 can abut and lean on the circumference of the compact disc 3.

When ejecting the compact disc 3, the roller 110 rotates in a direction reverse to the entering direction of the compact disc 3, then the compact disc 3 can be swung out of the optical disc drive 10 in the reverse direction. At the same time, the distance between the roller 110 and the guiding portion 12 is changed continuously to eject the disc 3.

In addition, an initial location of the roller can be chosen as desired (before loading the compact disc into the optical disc drive) to guide different sizes of compact discs such as 8 cm or 12 cm into the optical disc drive.

Moreover, in the embodiments, the compact disc is used for the slot-in optical disc drive. However, the disc is not limited to the compact disc (CD) and any disc such as digital versatile disc (DVD) or blue-ray disc (BD) may be used.

As a conclusion, the disc loading and ejecting structure of the invention provides a movable roller to achieve the function as desired. Its structure is smaller and does not occupy too much space in the optical disc drive, thus it is desirable for slim and light slot-in optical disc drives. It also solves the problems of the conventional techniques that adopt a vertical wheel with a smaller diameter and result in inadequate driving power or generate noises easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A disc loading and ejecting structure for a slot-in optical disc drive to drive a disc into and out of the slot-in optical disc drive, comprising:
    a driving portion which is located at one side of the slot-in optical disc drive and includes a roller with a rotation axis in parallel with a positioning surface of the disc; and
    a guiding portion located at another side of the slot-in optical disc drive opposite to the driving portion;
    wherein a first end edge of the disc is abutted on the guiding portion and a second end edge is leaned on the roller while the disc is inserted into and ejected from the slot-in optical disc drive,
    wherein the roller is movable reciprocally in parallel with the direction of the rotation axis thereof.

2. The disc loading and ejecting structure of claim 1, wherein the roller is coupled on an axle and moves axially and reciprocally thereon, the axle being driven by a power source to rotate the roller.

3. The disc loading and ejecting structure of claim 2, wherein the power source is a motor.

4. The disc loading and ejecting structure of claim 2, wherein the axle includes a plurality of guiding tracks in parallel with the axis thereof, the roller including a plurality of latch members mating the guiding tracks so that the roller is held and slid on the guiding tracks and when the axle rotates, the guiding tracks drive the latch members to rotate the roller.

5. The disc loading and ejecting structure of claim 1 further comprising a limiting member for providing an elastic force on the roller so that the roller leans on the circumference of the disc.

6. The disc loading and ejecting structure of claim 1, wherein the guiding portion includes an elongate groove with a retaining space mating the thickness of the disc such that the first end edge of the disc is retained in the retaining space.

7. The disc loading and ejecting structure of claim 1, wherein the guiding portion includes a fixed fulcrum about which the guiding portion rotates.

8. The disc loading and ejecting structure of claim 1, wherein the guiding portion moves in a direction perpendicular to the loading direction of the disc.

9. A disc loading and ejecting structure for a slot-in optical disc drive to drive a disc into and out of the slot-in optical disc drive, comprising a driving portion and a guiding portion that are located at two opposite sides of the slot-in optical disc drive, the driving portion comprising:

an axle in parallel with a positioning surface of the disc; and a roller coupled on the axle and moved reciprocally in parallel with an axis of the axle;

wherein the axle is driven by a power source to rotate the roller and a first end edge of the disc is abutted on the guiding portion and a second end edge is leaned on the roller while the disc is inserted into and ejected out of the slot-in optical disc drive.

10. The disc loading and ejecting structure of claim 9 further comprising a limiting member for providing an elastic force on the roller so that the roller leans on the circumference of the disc.

11. The disc loading and ejecting structure of claim 9, wherein the axle includes a plurality of guiding tracks in parallel with the axis thereof and the roller including a plurality of latch members mating the guiding tracks so that the roller is held and slid on the guiding tracks and when the axle rotates, the guiding tracks drive the latch members to rotate the roller.

12. The disc loading and ejecting structure of claim 9, wherein the guiding portion includes an elongate groove with a retaining space mating the thickness of the disc such that the first end edge of the disc is retained in the retaining space.

13. The disc loading and ejecting structure of claim 9, wherein the power source is a motor.

14. The disc loading and ejecting structure of claim 9, wherein the guiding portion includes a fixed fulcrum about which the guiding portion rotates.

15. The disc loading and ejecting structure of claim 9, wherein the guiding portion moves in a direction perpendicular to the loading direction of the disc.

\* \* \* \* \*